US009542296B1

(12) United States Patent
Engers et al.

(10) Patent No.: US 9,542,296 B1
(45) Date of Patent: Jan. 10, 2017

(54) DISK REPLACEMENT USING A PREDICTIVE STATISTICAL MODEL

(71) Applicant: Amazon Technologies, Inc., Seattle, WA (US)

(72) Inventors: Ross Bevan Engers, Cape Town (ZA); Stefan Letz, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 14/557,374

(22) Filed: Dec. 1, 2014

(51) Int. Cl.
*G06F 11/00* (2006.01)
*G06F 11/34* (2006.01)
*G06F 11/20* (2006.01)
*G06F 11/10* (2006.01)

(52) U.S. Cl.
CPC ....... *G06F 11/3452* (2013.01); *G06F 11/1096* (2013.01); *G06F 11/2033* (2013.01); *G06F 11/2094* (2013.01)

(58) Field of Classification Search
CPC .............. G06F 11/2033; G06F 11/2094; G06F 11/3452
See application file for complete search history.

(56) References Cited

U.S. PATENT DOCUMENTS

| | | | | | |
|---|---|---|---|---|---|
| 5,371,882 | A | * | 12/1994 | Ludlam | G06F 11/2094 714/6.32 |
| 5,566,316 | A | * | 10/1996 | Fechner | G06F 11/1662 711/114 |
| 5,878,201 | A | * | 3/1999 | Onishi | G06F 11/006 714/6.12 |
| 6,598,174 | B1 | * | 7/2003 | Parks | G06F 11/008 711/162 |
| 9,141,457 | B1 | * | 9/2015 | Ma | G06F 11/008 |
| 9,189,309 | B1 | * | 11/2015 | Ma | G06F 11/3034 |
| 9,229,796 | B1 | * | 1/2016 | Ma | G06F 11/008 |
| 2003/0216888 | A1 | * | 11/2003 | Ridolfo | G05B 23/0283 702/181 |
| 2005/0283655 | A1 | * | 12/2005 | Ashmore | G06F 11/004 714/6.32 |
| 2006/0075283 | A1 | * | 4/2006 | Hartung | G06F 11/1092 714/6.2 |
| 2006/0077726 | A1 | * | 4/2006 | Shimmitsu | G06F 11/2094 365/189.05 |
| 2007/0079170 | A1 | * | 4/2007 | Zimmer | G06F 11/008 714/6.23 |
| 2007/0143718 | A1 | * | 6/2007 | Abercrombie | G06F 17/5009 716/52 |
| 2007/0171562 | A1 | * | 7/2007 | Maejima | G06F 11/1662 360/69 |
| 2008/0183987 | A1 | * | 7/2008 | Ito | G06F 11/004 711/161 |

(Continued)

*Primary Examiner* — Joshua P Lottich
(74) *Attorney, Agent, or Firm* — Baker & Hostetler LLP

(57) ABSTRACT

In a provider network, attributes of one of a plurality of storage devices of the provider network are identified for failure monitoring. Based on a failure prediction model, a predicted probability of failure of the selected storage device is determined. The failure prediction model is based on historical and current data associated with failures of the storage devices of the provider network that have common attributes. The selected storage device is deactivated in response to determining that the predicted probability of failure of the selected storage device meets a criterion.

23 Claims, 6 Drawing Sheets

(56) References Cited

U.S. PATENT DOCUMENTS

| | | | | |
|---|---|---|---|---|
| 2008/0244309 A1* | 10/2008 | Fukuyama | ............ | G06F 11/008 714/6.12 |
| 2009/0271657 A1* | 10/2009 | McCombs | ............ | G06F 11/004 714/6.2 |
| 2010/0077252 A1* | 3/2010 | Siewert | ............... | G06F 11/2094 714/6.12 |
| 2012/0096309 A1* | 4/2012 | Kumar | .................... | G06F 11/00 714/6.22 |
| 2013/0061087 A1* | 3/2013 | Kopylovitz | ........... | G06F 11/106 714/6.3 |
| 2013/0227345 A1* | 8/2013 | Gadekar | ............. | G06F 11/1092 714/6.22 |
| 2014/0019813 A1* | 1/2014 | McLean | ............ | G06F 17/30575 714/47.3 |
| 2015/0046756 A1* | 2/2015 | Sreekumaran | ........ | G06F 11/008 714/47.2 |
| 2015/0286531 A1* | 10/2015 | Bondurant | ............. | G11B 5/012 714/6.23 |
| 2015/0286546 A1* | 10/2015 | Brethauer | ............... | G01F 15/16 714/6.3 |
| 2016/0070628 A1* | 3/2016 | Joshi | ................... | G06F 11/2094 714/6.22 |

* cited by examiner

DISK REPLACEMENT USING A PREDICTIVE STATISTICAL MODEL

BACKGROUND

A data center is a facility that houses computer systems and various networking, storage, and other related components. Data centers may, for example, provide computing services to businesses and individuals as a remote computing service or to provide "software as a service" (e.g., cloud computing). When a failure of a component such as a storage device occurs, customers may lose data and may be unable to provide services to their downstream customers, resulting in lost revenue and customer dissatisfaction.

BRIEF DESCRIPTION OF DRAWINGS

References are made to the accompanying drawings that form a part hereof, and that show, by way of illustration, specific embodiments or examples. The drawings herein are not drawn to scale. Like numerals represent like elements throughout the several figures. In the figures, reference numbers may be reused to indicate correspondence between referenced elements. The drawings are provided to illustrate example embodiments described herein and are not intended to limit the scope of the disclosure.

DETAILED DESCRIPTION

Figure 1:
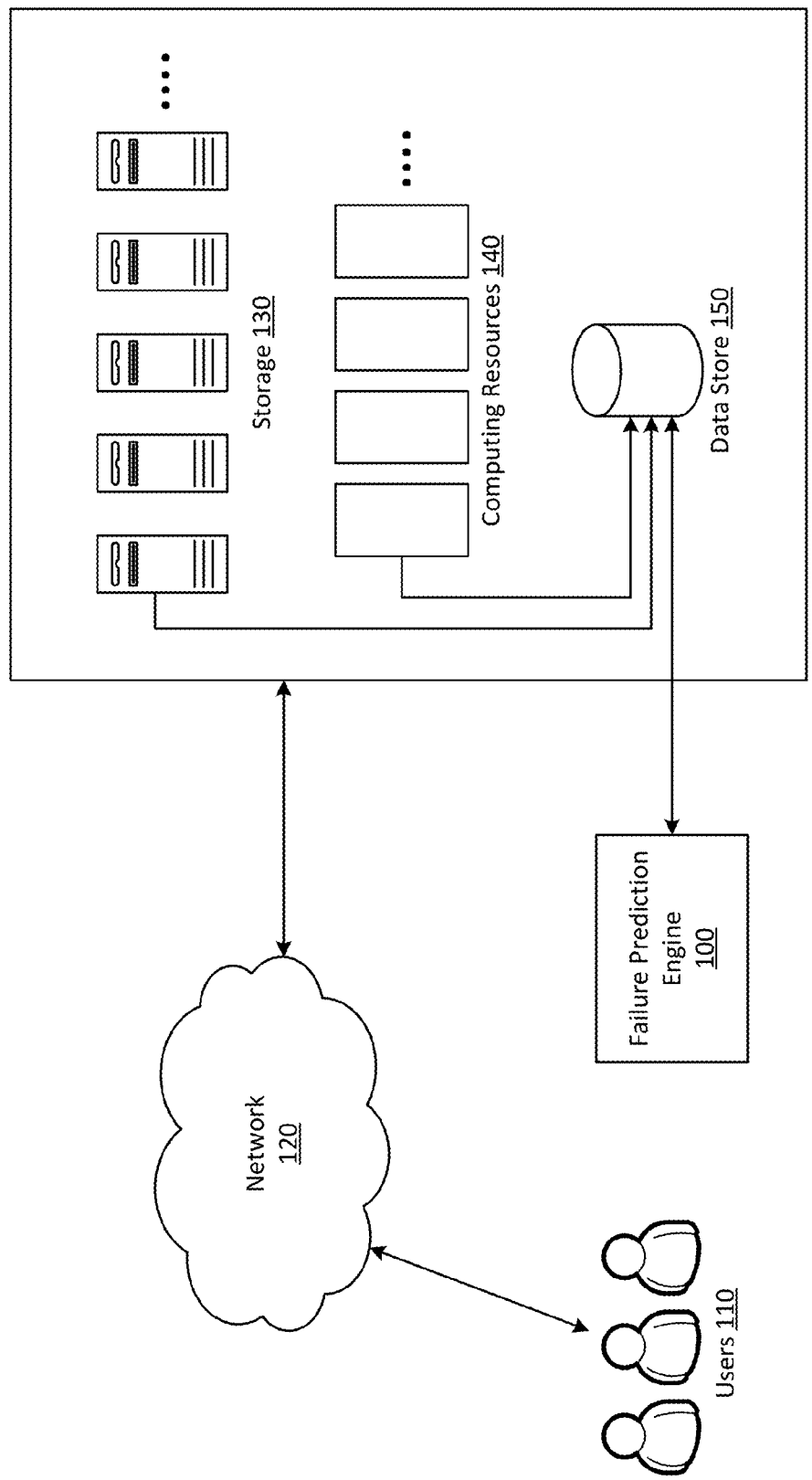
FIG. 1 is a diagram illustrating a mechanism for managing storage devices in accordance with the present disclosure.

A data center may house many thousands of components such as servers and storage devices. When a device fails, the loss of the device may result in lost data, down time, and customer dissatisfaction. It would be useful to predict failure of a device before a failure actually occurs, allowing the service provider to take preemptive measures, such as bringing another device on-line, and thus avoiding problems associated with an unexpected loss of a device. In various embodiments, this disclosure describes methods and systems for predicting future device failures. In one embodiment, failures that are likely to occur are determined so that the provider network can replace devices before a failure actually occurs. The failure predictions are determined using historical and real time data. For example, if the device is a storage device such as a disk drive, then historical and real time data pertaining to disk type, year of production, duration of use, usage patterns, operating system, redundant array of independent disks (RAID) configuration, temperature patterns, and other factors may be analyzed. The likelihood of failure of the device can be determined for a time period such as over a thirty day period. The provider network determines a criterion such as a probability at which the device will be replaced. For example, the provider network can replace a disk drive if the determined probability of failure is 95% over the next 30 days. The provider network can determine an objective that it wishes to achieve, such as to have zero actual failures for live devices with a given confidence level.

In some embodiments, customers may be allowed to select a confidence level with which devices that are allocated for providing computing resources to that customer is allowed to continue operating. For example, a customer may select a confidence level of 99% that computing devices providing services for that customer will operate without failure. In other embodiments, the provider network can select the confidence level.

If the customer is allowed to select the confidence level, the option may be associated with levels of service for the customer. For example, different confidence levels may be associated with difference levels of service, which in turn can be associated with different fee structures. If the provider network selects the confidence level, the provider network can determine confidence levels in accordance with provider network policies and/or desired levels of service.

In some embodiments, Self-Monitoring, Analysis and Reporting Technology (SMART) information may be used for the failure prediction analysis. Other information that may be used can include, for example, disk type (manufacturer, size, year, model), age of disk, and so on. In a provider network that has a large networked set of computing and storage devices, the provider network is in a position to access a large amount of device data that is unique to characteristics of the provider network such as data center locations, operating conditions within the data centers, and usage patterns.

A dynamic statistical model can be established using data from hosts on the provider network. Such data may include not only SMART data reported from the disk devices, but also I/O data and kernel log reports from the hosts. Furthermore, the data may include historic data where disks have previously failed. Other data may include disk type, manufacturer, size, year, model, disk age, length of time that the disk has operated in a particular setting, when created, operating system, SCSI controller, type of controller on the motherboard, RAID configuration, host type, geographic and physical location data (e.g., geographic region and location within the data center), temperature, humidity, usage pattern (e.g., continuous operation, minimal usage, or infrequence spikes in usage), and historic or real-time data pertaining to I/O data on the disks. With the accessed data, in one embodiment machine-learning can be used to cluster the data by various axes. A probability distribution function can be determined for each type of hard disk or other device that is being used in a similar fashion. The types may include, for example, manufacturer, model, size, age, historic and current access patterns, and utilization for the device. A range in the probability distribution function that includes the majority of the healthy devices can then be determined The provider network can identify devices that are outliers in the probability distribution function and initiate workflows to replace the identified devices. The provider network can, for example, identify parameters such as the distance that outliers need to be from a given probability distribution function before replacement is considered.

The identified parameters can correspond to the confidence level with which the provider network can predict failures. The confidence level can be offered as a service to customers of the provider network. The customers may choose a confidence interval with which to replace the disk, and the provider network can select parameters to provide the confidence level. For example, a customer may select auto-replacement of a disk when the probability of failure is greater than 80% within the next month. Alternatively, the provider network can provide one or more levels of service where the customer does not have to consider specific confidence levels. If a disk is selected for replacement, then the customer's data can be migrated to another disk prior to removal of the identified disk from service. The confidence levels can be associated with service level agreements for customers. Since a storage device may have data stored thereon for customers with different service level agreements, if a confidence level has been reached for a customer for such a storage device, then that customer's data may be moved to another disk with an acceptable predicted failure and confidence level. Alternatively, the storage device can be identified for replacement based on the most stringent service level agreement for data storage on that storage device.

In some cases the storage devices may be allocated to customers as virtual storage devices in which the customers are allocated logical disks that are physically mapped to the underlying physical storage devices. In this case a customer may have data storage on one logical device that maps to more than one physical device. Each of the physical devices may be monitored for predicted failures and subject to the same service level agreement for that customer.

As an additional feature, data on storage devices that are allocated to customers may be automatically backed up prior to the predicted failure point. Because a device failure can actually occur earlier than the predicted point of failure, the provider network can provide additional measures against potential data loss by backing up the customer's data at some point prior to the removal/deactivation time. For example, if the service level agreement dictates that a customer's storage devices will be deactivated/replaced when the predicted probability of failure reaches 95% within the next thirty days, then the customer's data on those storage devices may be backed up when the predicted probability of failure reaches 90% within the next thirty days.

In an embodiment, data may be clustered along one or more axes and weights may be assigned to each data input. Simulations may be executed to determine weights, and the weights can be updated as new data becomes available. In some embodiments, the simulation can select initial weights and readjust weights during successive iterations until predictions improve and converge.

While the present disclosure describes examples in terms of storage devices, it should be understood that the disclosed principles may be applied to other types of devices and to predicting other types of events. For example, an event can be any type of system impairment, such as loss of network connectivity or failure to respond within a specified time limit.

FIG. 1 is a diagram illustrating an failure prediction engine 100 for providing event predictions in accordance with the present disclosure. In FIG. 1, a data center may include resources and applications that may execute, for example, on one or more storage devices 130. It will be appreciated that some embodiments may involve additional computing resources 140 of various types that may be provided.

FIG. 1 also illustrates a network 120 that may include one or more computers accessible by users 110. According to one embodiment, resources executing on storage devices 130 may be configured to provide computing services to users 110 via network 120. For example, a resource may provide a set of remote access enterprise applications to a group of users who may, for example, be employees of an enterprise customer. FIG. 1 also illustrates a data store 150 that may store data pertaining to various events and metrics for storage devices 130 and resources 140.

A request may be sent to a failure prediction engine 100 for monitoring and analyzing one or more of the storage devices 130 or resources 140. In some embodiments, a request may be received from a user 110 for event probabilities. In other embodiments, the request may be received from one or more services at the service provider. In response to receipt of the request, failure prediction engine 100 may log the request and provide updates as to the status of the request. The failure prediction engine 100 may communicate with other services to facilitate: (1) processing of the request, (2) collection of data pertaining to request, and (3) generating interfaces to provide results of the request. The failure prediction engine 100 may, for example, provide an interface for facilitating submission of the request. The failure prediction engine 100 may further provide an interface for viewing the results of the request and modifying or cancelling the request.

Failure prediction engine 100 may be configured to provide analysis and diagnostics for providing predicted event probabilities based on real time or accumulated and/or archived monitoring of various devices. The failure prediction engine 100 may access metrics, such as disk type and disk usage activity. The failure prediction engine 100 may be made accessible via an application programming interface (API) or a user interface that may be accessed via a Web browser or other input mechanisms.

In some embodiments, an expert system that utilizes logical inferences based on the available information may be used. An expert system may take available information pertaining to actual failures of devices and use the information as input to a rules-based system to generate updated event probabilities. The available information may be provided to, for example, a Bayesian process to determine an updated probability for the event.

Within this operating environment, failure prediction engine 100 may determine a predicted probability of a failure. Failure prediction engine 100 may gather data from other components of the operating environment, such as data store 150. Data store 150 may collect information from storage devices 130 and other resources 140, among others. The failure prediction engine 100 may also collect information stored in log files and other locations. The information may also be obtained by querying devices for data that is not currently being stored in a log file.

In some cases, failure prediction engine 100 may not have access to all available data for the relevant devices because doing so would take too much time, would require too much storage space to store, or some of the data may have been determined to have a low likelihood of being relevant to determining the event rate for the device of interest. In other cases, some of the data may be configured only to be accessible manually or may be unavailable because the data is on a network segment to which the failure prediction engine 100 does not have access. The failure prediction engine 100 may use the available information to determine an initial probability for an event and update the probability as more information becomes available.

Bayesian probability techniques may be used to determine initial (prior) and updated (posterior) probabilities for events. As an example, the failure rate for a disk drive may be determined to be 1%/month based on a historical failure rate for all disk drives for a particular provider. Without knowing anything other than that this is a disk drive, the probability for this hypothetical is a 1% chance that the disk drive will fail within one month. If it is also known that the disk drive is located in North Carolina, then an additional piece of information that is known may be that disk drives in North Carolina have a 3% chance of failure within one month. This may be identified as P(S|N)=0.03 (which expresses that the probability of a failure event "disk drive fails" given the data "disk drive is located in North Carolina" is true is 3%).

In this example, P(S) is what is known about the probability of a disk drive failure without factoring in the location of the disk drive and may be referred to as the prior probability in Bayesian terminology. Then P(S|N) is the likelihood of a disk drive failure if the server is located in North Carolina is factored in and may be referred to as the posterior probability in Bayesian terminology. The posterior probability can continued to be adjusted as additional factors are considered. For example, additional information that is known may be that disk drives that are allocated to a particular customer and that customer's usage patterns have a 4% chance of failure within one month, and that the historical failure rate for disk drives for the particular manufacturer that were manufactured in 2012 have a 3.5% chance of failure within one month. The additional information may be used to further refine the posterior probabilities.

As a further example of applying Bayesian probability techniques to predicting the failure of a disk drive, the probabilities of failure may include: a 5% chance of failure within two years if the disk is manufactured by Company A; a 7% chance of failure within two years if the disk is utilized in Region A; and a 8% chance of failure within two years if the disk is manufactured by Company A and is utilized with usage pattern Z. This information may be used to estimate probabilities of failure for various combinations of factors.

After the probability has been calculated, information regarding the predicted failure may be returned to the user who requested information about the failure. The predicted failure probability based on the most recent information may be provided. Additionally, updates to the predicted failure probability may be provided if new information that affects the calculation is made available.

In some embodiments, the probability analysis may be performed based on machine learning via a machine learning system that includes one or more learning functions that learns the probabilities associated with the availability of various data that may be relevant to the determination of the event rate. This probability analysis may also be performed based on history data of prior probability analyses, or performed based on a user indication of a rule to be used in the probability calculation.

In some embodiments, the failure prediction engine 100 may monitor failures and device attributes automatically. For example, the service provider may monitor a number of pre-selected failure events collected or determined at a predetermined frequency. Additional failure event data may be collected at the same or different frequencies as specified by the service provider. It should be understood that the failure event data may be collected for any of the computing resources provided by the service provider including servers, databases, storage, and the like.

Additionally, the failure prediction engine 100 may provide users with the ability to request and receive notifications or to take specified actions depending on the failure events. For example, the service provider may migrate data from a disk drive that is predicted to fail and shut down the disk drive. In some embodiments, the event data may be retained for a predetermined time to allow users to retrieve historical metric data for review and analysis. A user interface may be provided to allow access to the failure prediction engine 100.

In some embodiments, a time frame for the failure event prediction may be specified as well as the resources to be evaluated. For example, a user may want to determine the predicted failure rate for a group of disk drives over a period of one month.

The failure prediction engine 100 may provide a detailed analysis and summary of results to the requesting user. In some embodiments, an API may be provided to facilitate requests for predicted event information. For example, an API can be called with information such as a device identifier, event start time, and event end time. After the API is called, in one embodiment the failure prediction engine 100 may take actions such as:

Access activity logs for the device.
Retrieve configuration data of related devices.
Call available APIs that can provide metrics for the devices.
Invoke a probability determination function to generate the predicted probability of a failure.

Using the gathered information, the failure prediction engine 100 may analyze the data, combine or aggregate the data or extract portions of the data as appropriate, and invoke the probability determination function to generate the predicted probability of a failure. The determined event probability may be reported through the API along with details regarding potential causes for the event prediction.

When a user is initiating a request for a failure prediction, the API may return metadata about the device associated with the request. A request identifier may be generated to track and process the request.

Figure 2:
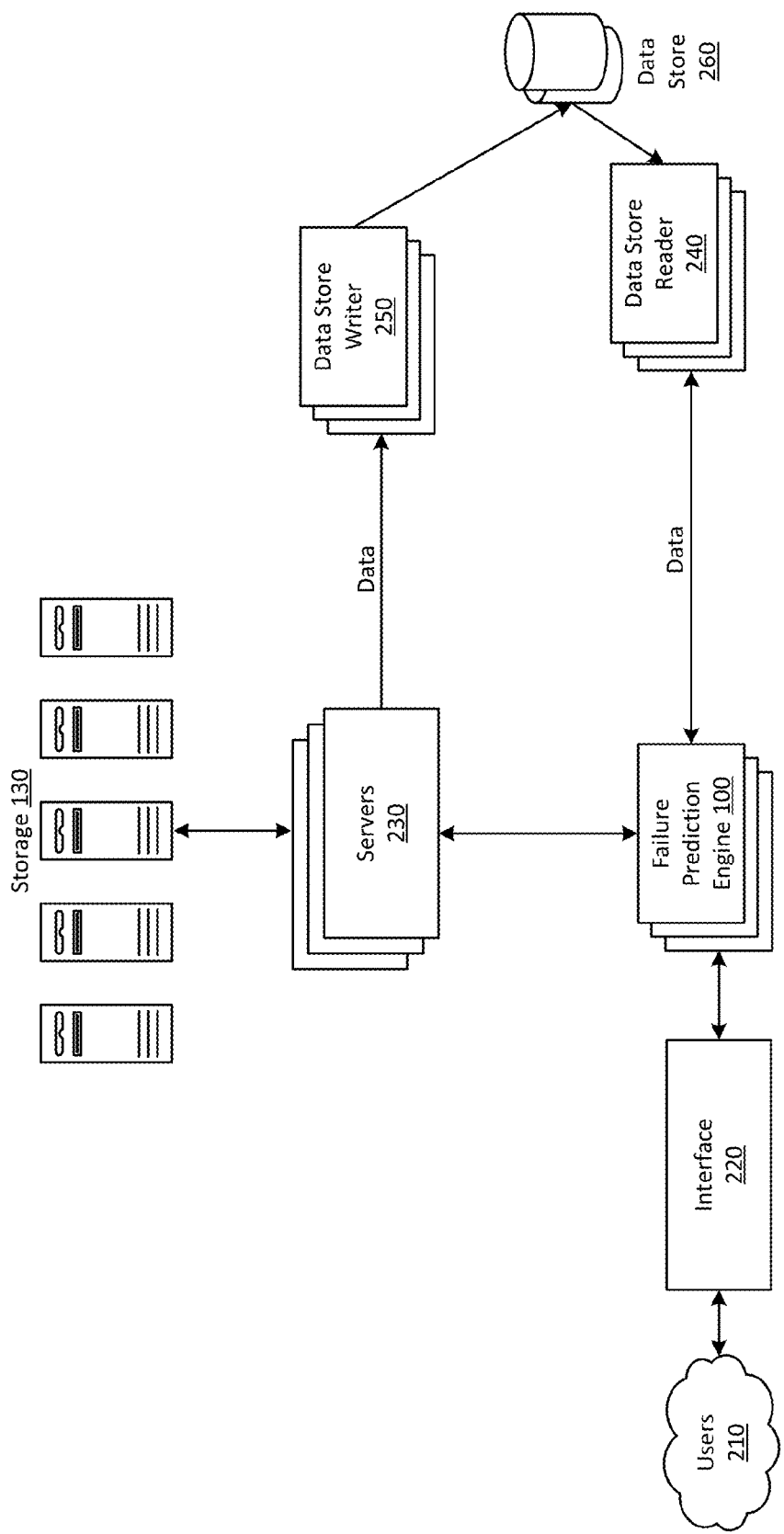
FIG. 2 is a diagram illustrating an example system for managing storage devices in accordance with the present disclosure.

Referring to FIG. 2, illustrated is an example implementation of functionality associated with the failure prediction engine 100. The failure prediction engine 100 may access, or cause access to, various data such as metrics and event histories. The failure prediction engine 100 may also generate or cause the generation of data. Users 210 of the service provider may access a user interface 220 for requesting data. In some embodiments, the user interface 220 can be generated by functions implemented in software executing on one or more servers 230. The requested metric data may be provided to a data store writer 250 that may store the data. A data store reader 240 may be configured to access the data store 260 and retrieve data based on requests from the users 210 or for other purposes. The failure prediction engine 100 may manage the various data that are to be collected. For example, the failure prediction engine 100 may take actions such as invoke a service to generate a set of available metrics pertaining to the request and the associated device. The failure prediction engine 100 may also access activity logs for the device, health status for the device, connection states for the device, configurations for the device, and hardware attributes (e.g., manufacturer, date of manufacture, etc.). Other types of data may be accessed as determined by the failure prediction engine 100, such as the type of device, physical location, installed software, usage patterns, and so on.

In some embodiments, attributes of the device can be selected based on biasing to identify attributes that may have greater impact on the probability calculation. For example, data for an initial set of attributes can be weighted to indicate relevance of the attributes to the failure. The weighting can be continuously updated to increase the accuracy of the biasing.

In some embodiments, an API or a programming interface sub-system may be provided for facilitating the submission of failure prediction requests. The API may be configured to receive electronic messages that encode identifiers indicative of a failure prediction request for fulfillment by the failure prediction engine 100. In response to receiving one of the electronic messages, the API may send second electronic messages indicative of information indicating that a failure prediction request has been received and may provide the results of the failure prediction calculation.

Figure 3:
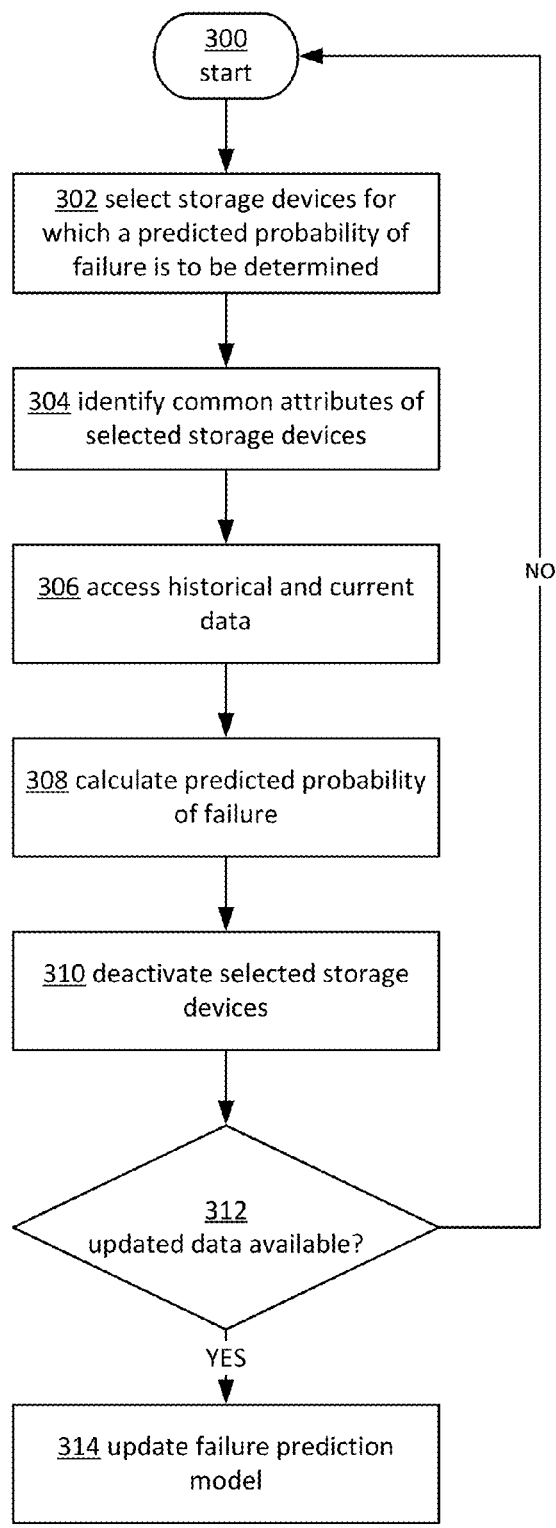
FIG. 3 is a flowchart depicting an example procedure for managing storage devices in accordance with the present disclosure.

FIG. 3 illustrates an example operational procedure for managing storage devices of a provider network. In an embodiment, a mechanism for managing storage devices can be provided by services such as failure prediction engine 100 in FIG. 1. The operational procedure may be implemented in a system comprising one or more computing devices. In one embodiment, the system may comprise a computing services platform, such as a multi-tenant web services platform. Referring to FIG. 3, operation 300 begins the operational procedure. Operation 300 may be followed by operation 302. Operation 302 illustrates selecting one or more storage devices for which a predicted probability of failure is to be determined Operation 302 may be followed by operation 304. Operation 304 illustrates identifying common attributes of the selected storage devices.

Operation 304 may be followed by operation 306. Operation 306 illustrates accessing historical and real-time data associated with failure of the selected storage device. In one embodiment, the historical and current data selected based at least in part on the common attributes. Operation 306 may be followed by operation 308. Operation 308 illustrates calculating the predicted probability of failure based at least in part on the historical and current data associated with the failure of the selected storage devices and a failure prediction model.

Operation 308 may be followed by operation 310. Operation 310 illustrates deactivating the selected storage devices in response to determining that the selected storage devices have a predicted probability of failure that meets one or more criteria. Operation 310 may be followed by operation 312. Operation 312 illustrates determining if updated data associated with the failure of the storage devices becomes available. If updated data is available, then operation 312 may be followed by operation 314. Operation 314 illustrates updating the failure prediction model as updated data associated with the failure of the storage devices becomes available.

In some embodiments, the one or more criteria includes a probability of failure during a period of time. The predicted probability of failure may include a probability distribution function. In one embodiment, the failure prediction model comprises a weighted combination of the common attributes. The common attributes can include one or more of a disk type, disk age, operating system, RAID configuration, temperature patterns, humidity patterns, and usage patterns. Provider networks may utilize RAID technology to implement disk mirroring for the replication of logical disk volumes.

As discussed above, the user interface may be an application programming interface (API) configured to receive first electronic messages that encode identifiers indicative of the request, and, in response to receiving one of the first electronic messages, send second electronic messages indicative of information pertaining to the request.

Various aspects of the disclosure are described herein with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the description detailed herein, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment and the like, that may be used to implement and distribute the infrastructure and services offered by the provider network. The resources may in some embodiments be offered to clients in units called "instances," such as virtual or physical computing instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages such as Ruby, Perl, Python, C, C++ and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 4:
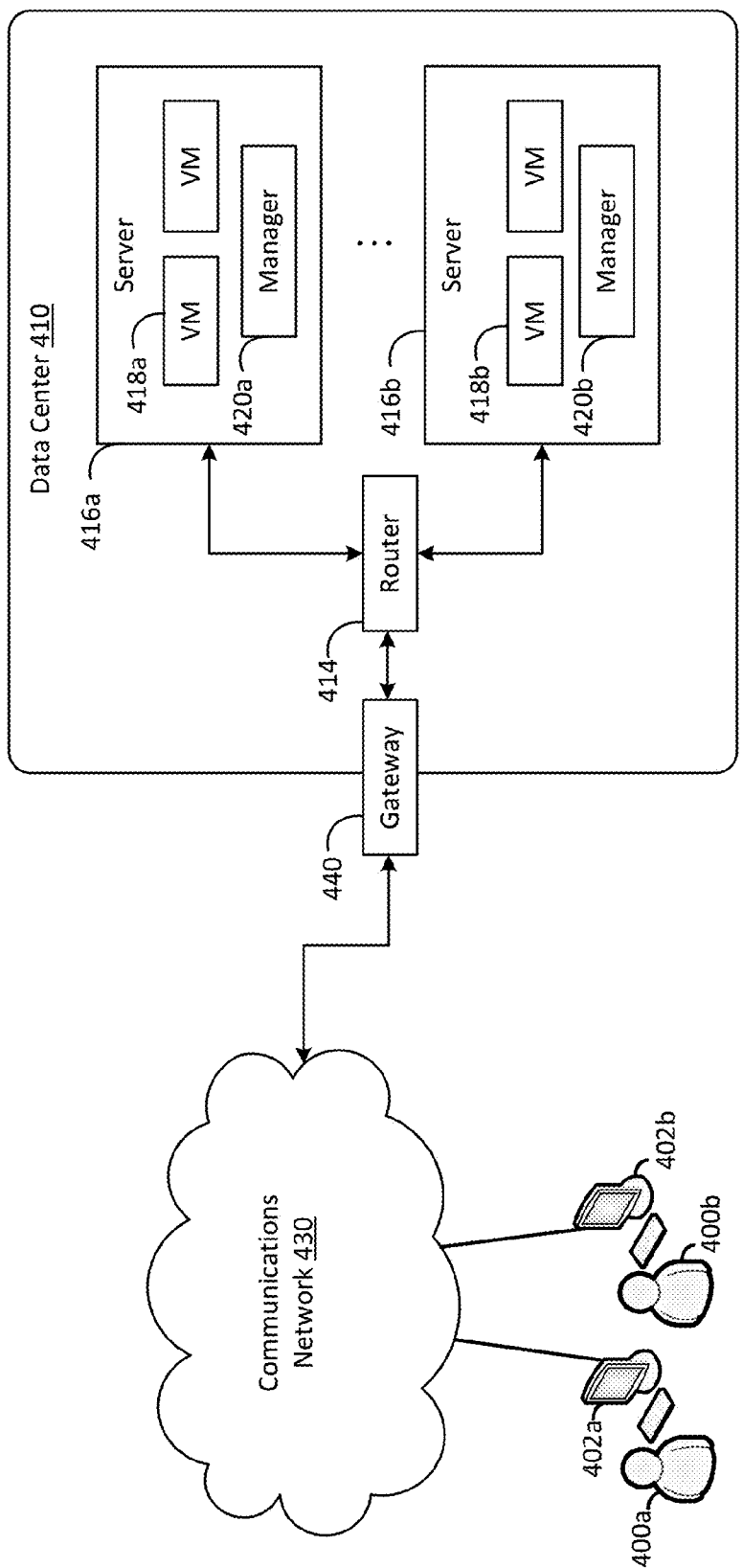
FIG. 4 is a diagram illustrating an example computing system that may be used in some embodiments.

FIG. 4 illustrates an example computing environment in which the embodiments described herein may be implemented. FIG. 4 is a diagram schematically illustrating an example of a data center 410 that can provide computing resources to users 400a and 400b (which may be referred herein singularly as "a user 400" or in the plural as "the users 400") via user computers 402a and 402b (which may be referred herein singularly as "a computer 402" or in the plural as "the computers 402") via a communications network 430. Data center 410 may be configured to provide computing resources for executing applications on a permanent or an as-needed basis. The computing resources provided by data center 410 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as Web servers and/or one large processing resource as a database server, for example.

Data center 410 may include servers 416a and 416b (which may be referred herein singularly as "a server 416" or in the plural as "the servers 416") that provide computing resources available as virtual machine instances 418a and 418b (which may be referred herein singularly as "a virtual machine instance 418" or in the plural as "the virtual machine instances 418"). The virtual machine instances 418 may be configured to execute applications, including Web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 4, communications network 430 may, for example, be a publicly accessible network of linked networks and possibly operated by various distinct parties, such as the Internet. In other embodiments, communications network 430 may be a private network, such as, for example, a corporate or university network that is wholly or partially inaccessible to non-privileged users. In still other embodiments, communications network 430 may include one or more private networks with access to and/or from the Internet.

Communications network 430 may provide access to computers 402. Computers 402 may be computers utilized by customers 400 or other customers of data center 410. For instance, user computer 402a or 402b may be a server, a desktop or laptop personal computer, a tablet computer, a wireless telephone, a personal digital assistant (PDA), an e-book reader, a game console, a set-top box, or any other computing device capable of accessing data center 410. User computer 402a or 402b may connect directly to the Internet (e.g., via a cable modem or a Digital Subscriber Line (DSL)). Although only two user computers 402a and 402b are depicted, it should be appreciated that there may be multiple user computers.

Computers 402 may also be utilized to configure aspects of the computing resources provided by data center 410. In this regard, data center 410 might provide a Web interface through which aspects of its operation may be configured through the use of a Web browser application program executing on user computer 402. Alternatively, a stand-alone application program executing on user computer 402 might access an application programming interface (API) exposed by data center 410 for performing the configuration operations. Other mechanisms for configuring the operation of the data center 410, including deploying updates to an application, might also be utilized.

Servers 416a and 416b (which may be referred herein singularly as "a server 416" or in the plural as "the servers 416") shown in FIG. 4 may be standard servers configured appropriately for providing the computing resources described above and may provide computing resources for executing one or more applications. In one embodiment, the computing resources may be virtual machine instances 418. In the example of virtual machine instances, each of the servers 416 may be configured to execute an instance manager 420a or 420b (which may be referred herein singularly as "an instance manager 420" or in the plural as "the instance managers 420") capable of executing the virtual machine instances. The instance managers 420 may be a virtual machine monitor (VMM) or another type of program configured to enable the execution of virtual machine instances 418 on servers 416, for example. As discussed above, each of the virtual machine instances 418 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 410 shown in FIG. 4, a router 414 may be utilized to interconnect the servers 416a and 416b. Router 414 may also be connected to gateway 440, which is connected to communications network 430. Router 414 may manage communications within networks in data center 410, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 410 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
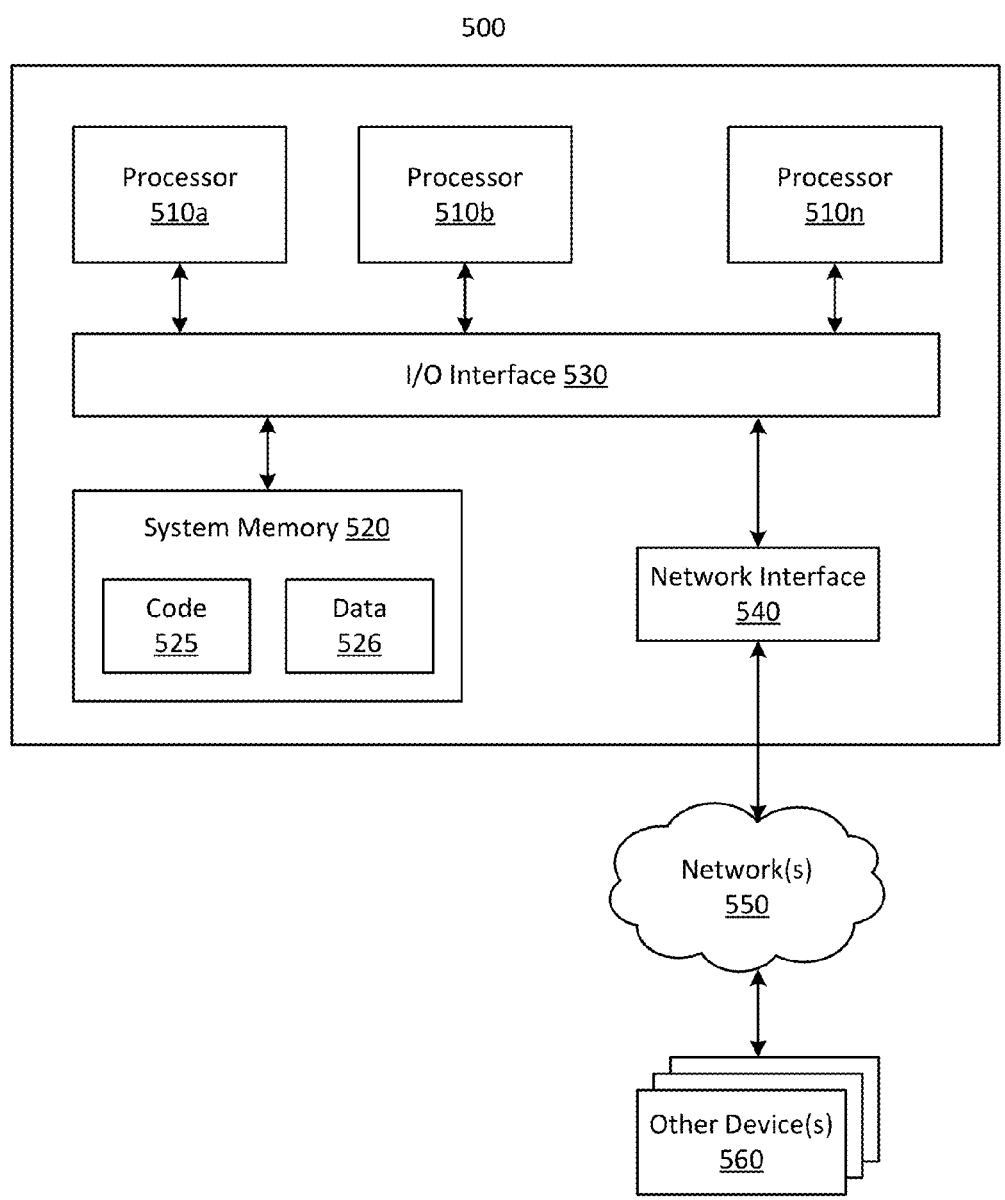
FIG. 5 is a diagram illustrating an example computing system that may be used in some embodiments.

In at least some embodiments, a server that implements a portion or all of one or more of the technologies described herein, including the techniques to implement the functionality of an failure prediction engine 100 may include a general-purpose computer system that includes or is configured to access one or more computer-accessible media. FIG. 5 illustrates such a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 4, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Systems and methods in accordance with various embodiments are operable to management access to resources such as data storage. In at least some embodiments, these approaches include providing a block data storage service that uses multiple server storage systems to reliably store block data that may be accessed and used over one or more networks by any of various users, applications, processes, and/or services. Users of the block data storage service may each create one or more persistent storage volumes that each have a specified amount of block data storage space, and may initiate use of such a persistent storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center.

In addition, in at least some embodiments, applications that access and use one or more such non-local persistent storage volumes over one or more networks may each have an associated node manager that manages the access to those non-local volumes by the program, such as a node manager module that is provided by the block data storage service and/or that operates in conjunction with one or more Block Data Service (BDS) System Manager modules. For example, a first user who is a customer of the block data storage service may create a first persistent storage volume, and execute one or more program copies on one or more computing nodes that are instructed to access and use the first volume (e.g., in a serial manner, in a simultaneous or other overlapping manner, etc.). When an application executing on a computing node initiates use of a non-local volume, the application may mount or otherwise be provided with a logical block data storage device that is local to the computing node and that represents the non-local volume, such as to allow the executing program to interact with the local logical block data storage device in the same manner as any other local hard drive or other physical block data storage device that is attached to the computing node (e.g., to perform read and write data access requests, to implement a file system or database or other higher-level data structure on the volume, etc.). For example, in at least some embodiments, a representative logical local block data storage device may be made available to an executing program via use of an appropriate technology, such as GNBD ("Global Network Block Device") technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or computing node) so as to perform the interactions on that stored volume copy on behalf of the executing program. Furthermore, in at least some embodiments, at least some of the described techniques for managing access of applications and services to non-local block data storage volumes are automatically performed by embodiments of a Node Manager module.

In at least some embodiments, persistent storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a program execution service ("PES") system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine computing nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the BDS System Manager, such as if one or more BDS System Manager modules are provided in a distributed peer-to-peer manner by multiple. interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a BDS System Manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

In at least some embodiments, some or all persistent storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to persistent storage volumes by moving or otherwise replicating volume copies when server block data storage systems become unavailable, the block data storage service may perform other actions in other situations to maintain access of executing programs to persistent storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all persistent storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all persistent storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent (or Inexpensive) Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a onetime purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more application programming interfaces (APIs) may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the block data storage service and/or program execution service.

Figure 6:
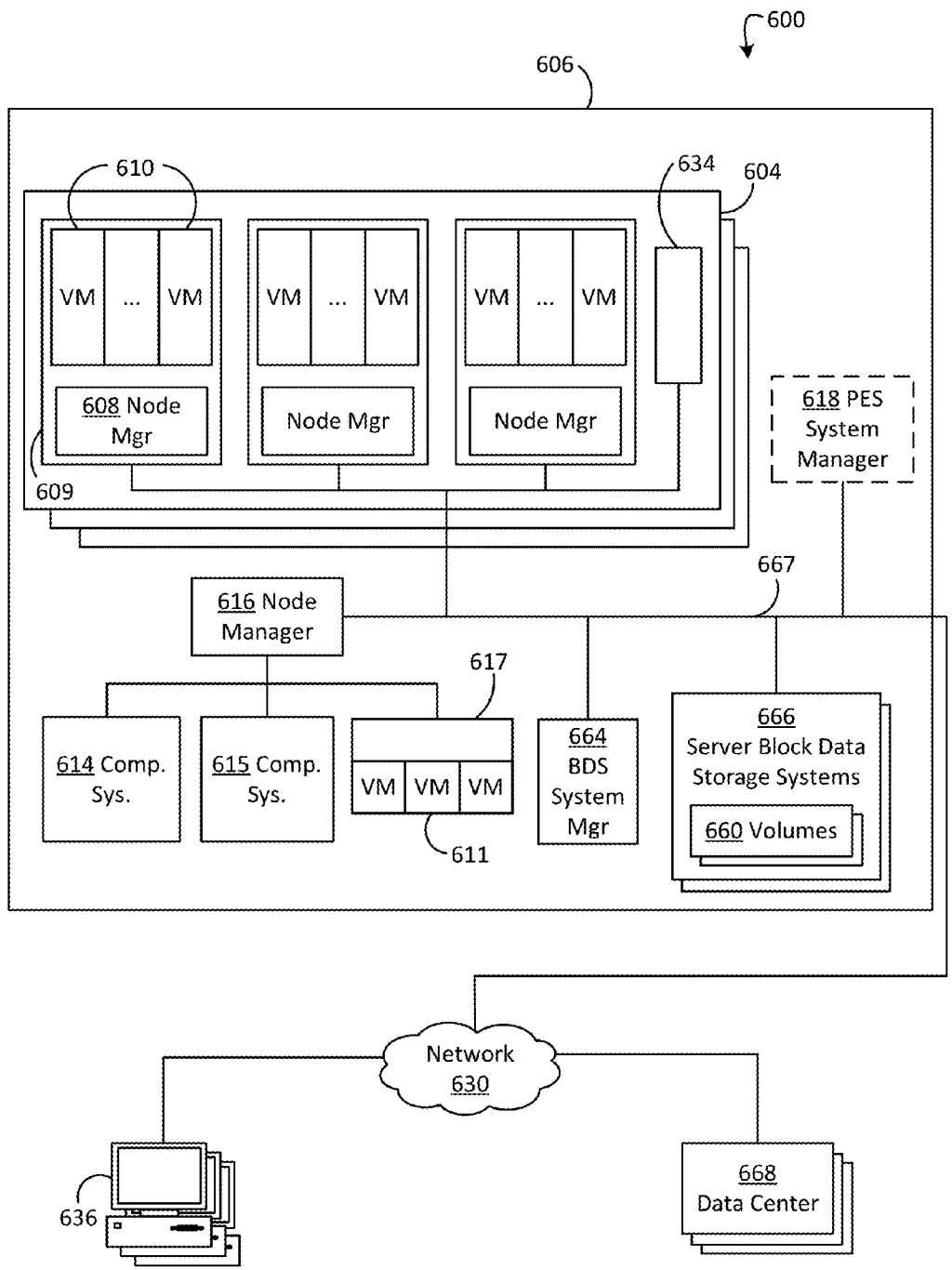
FIG. 6 depicts an example network services platform that provides a block data storage service.

FIG. 6 depicts an example network services platform that provides a block data storage service. This network services platform may use block storage devices to store data, such as the block storage volumes of FIG. 1, and may implement the operating procedures of FIG. 3.

Environment 600 of FIG. 6 provides multiple computing systems that are operable to access non-local block data storage, which, in one embodiment is block storage under the control of a block data storage service. Environment 600 also provides multiple computing systems that are operable to execute various programs, applications and/or services, which in one embodiment comprises one or more computing services under the control of one or more program execution services. In particular, in this example, a program execution service manages the execution of programs on various host computing systems located within a data center 606, and a block data storage service uses multiple other block data storage systems at the data center to provide reliable non-local block data storage to those executing programs. Multiple remote archival storage systems external to the data center may also be used to store additional copies of at least some portions of at least some persistent storage volumes.

In this example platform of FIG. 6, a data center 606 includes a number of racks, each rack including a number of host computing systems 606, as well as an optional rack support computing system 636 in this example embodiment. The host computing systems 606 on the illustrated rack 606 each host one or more virtual machines 610 in this example, as well as a distinct node manager module 608 associated with the virtual machines on that host computing system to manage those virtual machines.

One or more other host computing systems 616 may also each host one or more virtual machines 610 in this example. Each virtual machine 610 may act as an independent computing node for executing one or more program copies (not shown) for a user (not shown), such as a customer of the program execution service. In addition, this example data center 606 further includes additional host computing systems 616 that do not include distinct virtual machines, but may nonetheless each act as a computing node for one or more programs (not shown) being executed for a user. As used herein, a computing node may be implemented on a wide variety of computing environments, such as commodity-hardware computers, virtual machines, computing clusters and computing appliances. Any of these computing environments may, for convenience, be described as computing nodes.

In this example platform of FIG. 6, a node manager module 616 executing on a computing system (not shown) distinct from the host computing systems 616 and 616 is associated with those host computing systems to manage the computing nodes provided by those host computing systems, such as in a manner similar to the node manager modules 608 for the host computing systems 606. The rack support computing system 636 may provide various utility services for other computing systems local to its rack (e.g., long-term program storage, metering and other monitoring of program execution and/or of block data storage access performed by other computing systems local to the rack, etc.), as well as possibly to other computing systems located in the data center. Each computing system may also have one or more locally attached storage devices (not shown), such as to store local copies of programs and/or data created by or otherwise used by the executing programs, as well as various other components.

In this example platform of FIG. 6, an optional computing system is also illustrated and executes a PES (programmable execution system) system manager module 618 for the program execution service to assist in managing the execution of programs on the virtual machine instances provided by the host computing systems located within data center 606 (or optionally on computing systems located in one or more other data centers 668, or other remote computing systems 636 external to data center 606). As discussed in greater detail elsewhere, a PES system manager module may provide a variety of services in addition to managing execution of programs, including the management of user accounts (e.g., creation, deletion, billing, etc.), the registration, storage and distribution of programs to be executed, the collection and processing of performance and auditing data related to the execution of programs and the obtaining of payment from customers or other users for the execution of programs, etc. In some embodiments, the PES system manager module 618 may coordinate with the node manager modules 608 and 666 to manage program execution on computing nodes associated with the node manager modules 608 and 666. In other embodiments, the PES system manager module may manage the execution of programs without the assistance of the node manager modules 608 and 666.

In this example platform of FIG. 6, the data center 606 also includes a computing system that executes a Block Data Storage ("BDS") system manager module 666 for the block data storage service to assist in managing the availability of block data storage to programs executing on computing nodes provided by the host computing systems located within the data center (or optionally on computing systems located in one or more other data centers 668, or other remote computing systems 636 external to the data center). BDS system manager module 666 is depicted here as a separate component for ease of understanding and illustration. It may be appreciated, as with the other components, that there are embodiments where the various nodes communicate directly with system block data storage systems 666. In particular, in this example, the data center 606 includes a pool of multiple block data storage systems 666, which each have local block storage for use in storing one or more volume copies 660. Access to the volume copies 660 is provided over the internal network(s) 666 to programs executing on virtual machine 660, host computing systems 605, and host computing systems 616.

As discussed in greater detail in the paragraphs herein below, a BDS system manager module 666 may provide a variety of services related to providing block data storage functionality, including, for example: the management of accounts (e.g., creation, deletion, billing, etc.), the creation, use and deletion of persistent storage volumes and snapshot copies of those volumes, the collection and processing of performance and auditing data related to the use of persistent storage volumes and snapshot copies of those volumes and the obtaining of payment from entities for the use of persistent storage volumes and snapshot copies of those volumes and so on. In some embodiments, the BDS system manager module 666 may coordinate with the node manager modules 608 to manage use of volumes by programs executing on associated computing nodes, while in other embodiments the node manager modules 608 may not be used to manage such volume use. In addition, in other embodiments, one or more BDS system manager modules 666 may be structured in other manners, such as to have multiple instances of the BDS system manager executing in a single data center (e.g., to share the management of block data storage by programs executing on the computing nodes provided by the host computing systems located within the data center), and/or such as to have at least some of the functionality of a BDS system manager module being provided in a distributed manner by software executing on some or all of the block data storage systems 666 (e.g., in a peer-to-peer manner, without any separate centralized BDS system manager module 666).

In this example platform of FIG. 6, the various host computing systems, block data storage systems, and computing systems are interconnected via one or more internal networks 666 of the data center, which may include various networking devices (e.g., routers, switches, gateways, etc.) that are not shown. In addition, the internal networks 666 are connected to an external network 630 (e.g., the Internet or other public network), and the data center 606 may further include one or more other devices (not shown) at a connection point between the data center and an external network (e.g., network proxies, load balancers, network address translation devices, etc.). The data center 606 is connected via the external network 630 to one or more other data centers 668 that each may include some or all of the computing systems and storage systems illustrated with respect to data center 606, as well as other remote computing systems 636 external to the data center. The other remote computing systems 636 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or alternatively on one or more computing systems of the data center, as described in greater detail elsewhere. Furthermore, while not illustrated here, in at least some embodiments, at least some of the block data storage systems 666 may further be connected with one or more other networks or other connection mediums, such as a high-bandwidth connection over which the block data storage systems 666 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 6 has been simplified for the purposes of explanation, and that the number and organization of host computing systems, block data storage systems and other devices may be much larger than what is depicted in FIG. 6. For example, as one illustrative embodiment, there may be approximately 6,000 computing systems per data center, with at least some of those computing systems being host computing systems that may each host fifteen virtual machines, and/or with some of those computing systems being block data storage systems that may each store several volume copies. If each hosted virtual machine executes one program, then such a data center may execute as many as sixty thousand program copies at one time. Furthermore, hundreds or thousands (or more) of volumes may be stored on the block data storage systems, depending on the number of server storage systems, size of the volumes, and number of mirror copies per volume. It will be appreciated that in other embodiments, other numbers of computing systems, programs and volumes may be used.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for managing storage devices of a provider network, the method comprising:
   selecting one or more storage devices for which a predicted probability of failure is to be determined;
   identifying common attributes of the selected storage devices;
   accessing historical and current data associated with failure of the selected storage devices, the historical and real-time data selected based at least in part on the common attributes;
   calculating the predicted probability of failure based at least in part on the historical and real-time data associated with the failure of the selected storage devices and a failure prediction model;
   deactivating the selected storage devices in response to determining that the selected storage devices have a predicted probability of failure that meets one or more criteria, the one or more criteria comprising a probability of failure during a period of time indicated by the criteria; and
   updating the failure prediction model as updated data associated with the failure of the storage devices becomes available.

2. The method according to claim 1, wherein the predicted probability of failure comprises a probability distribution function.

3. The method according to claim 1, wherein the failure prediction model comprises a weighted combination of the common attributes.

4. The method according to claim 1, wherein the common attributes include one or more of a disk type, disk age, operating system, RAID configuration, temperature patterns, humidity patterns, and usage patterns.

5. The method according to claim 1, further comprising replacing the selected storage devices.

6. A system configured to manage storage devices in a provider network, the system comprising:
- at least one memory having stored therein computer instructions that, upon execution by one or more processors of the system, at least cause the system to:
- identify attributes of one of a plurality of storage devices of the provider network for failure monitoring;
- determine, based at least in part on a failure prediction model, a predicted probability of failure of the one of the plurality of storage devices, wherein the failure prediction model is based at least in part on historical and current data associated with failures of the plurality of storage devices that have common attributes; and
- identify for replacement the one of the plurality of storage device in response to determining that the predicted probability of failure of the one of the plurality of storage devices meets a criterion, the predicted probability of failure being indicative of a likelihood of failure of the one of the plurality of storage devices during a threshold period of time.

7. The system of claim 6, further comprising computer instructions that, upon execution by one or more processors of the system, at least cause the system to update the failure prediction model as updated data associated with failures become available.

8. The system of claim 7, further comprising computer instructions that, upon execution by one or more processors of the system, at least cause the system to update the failure prediction model based on a learning function.

9. The system of claim 6, wherein the criterion is selectable by a customer who has computing resources associated with the one of the plurality of storage devices.

10. The system of claim 9, wherein the criterion is associated with a service level agreement associated with the customer.

11. The system of claim 6, further comprising computer instructions that, upon execution by one or more processors of the system, at least cause the system to implement an application programming interface (API) configured to:
- receive first electronic messages indicative of a request for information associated with the predicted probability of failure; and
- send second electronic messages indicative of information associated with the request.

12. The system of claim 6, wherein the predicted probability of failure comprises a probability distribution function.

13. The system of claim 6, wherein the attributes include one or more of type, manufacturer, size, year of production, model, and duration of use of the one of the plurality of storage devices.

14. The system of claim 6, wherein the predicted probability of failure is determined by calculating the predicted probability using a current predicted probability as an initial probability, using updated data to adjust the initial probability, and using the calculated predicted probability as the current predicted probability for a subsequent predicted probability.

15. The system of claim 6, wherein the failure prediction model comprises a weighted combination of the attributes, wherein some attributes are weighted more based at least in part on greater expected relevance to the probability of failure.

16. The system of claim 6, wherein the attributes include SMART data reported from the storage devices of the provider network and kernel and other log reports from host computing devices.

17. The system of claim 6, wherein the attributes include geographic location and usage pattern of the storage devices of the provider network.

18. The system of claim 6, wherein the criterion is a zero actual failure rate within a level of confidence.

19. The system of claim 6, wherein at least some of the storage devices are allocated as virtual disks.

20. The system of claim 6, further comprising computer instructions that, upon execution by one or more processors of the system, at least cause the system to provide an automated backup of the data stored on the one of the plurality of storage devices based on the predicted probability of failure.

21. A non-transitory computer-readable storage medium having stored thereon computer-readable instructions, the computer-readable instructions comprising instructions that upon execution on one or more computing devices, at least cause the one or more computing devices to:
- based at least in part on a failure prediction model, determine a predicted probability of failure of a storage device that is allocated to a customer of a provider network, wherein the failure prediction model is based at least in part on past failure data associated with storage devices of the provider network that have one or more common attributes; and
- allocate a different storage device to the customer in response to determining that the predicted probability of failure of the allocated storage device meets at least one service level criterion associated with the customer, the at least one service level criterion associated with the predicted probability of failure occurring within a threshold period of time.

22. The non-transitory computer-readable storage medium of claim 21,
- wherein the predicted probability of failure is based at least in part on SMART data reported from the storage devices.

23. The non-transitory computer-readable storage medium of claim 21, having stored thereon further computer-readable instructions that, upon execution on the one or more computing devices, at least cause the one or more computing devices to:
- send a notification of the predicted probability of failure; and
- receive information indicative of taking a specified action in response to the predicted probability of failure.

* * * * *